United States Patent
Kolli

(10) Patent No.: US 12,217,276 B2
(45) Date of Patent: *Feb. 4, 2025

(54) ATTRIBUTE SELECTION FOR MATCHMAKING

(71) Applicant: Intuit Inc., Mountain View, CA (US)

(72) Inventor: Krishna Kolli, Dublin, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,368

(22) Filed: Sep. 7, 2023

(65) Prior Publication Data

US 2023/0419344 A1   Dec. 28, 2023

Related U.S. Application Data

(63) Continuation of application No. 16/059,482, filed on Aug. 9, 2018, now Pat. No. 11,790,381.

(51) Int. Cl.
*G06Q 30/02* (2023.01)
*G06F 18/214* (2023.01)
*G06Q 30/0202* (2023.01)

(52) U.S. Cl.
CPC ....... *G06Q 30/0202* (2013.01); *G06F 18/214* (2023.01)

(58) Field of Classification Search
CPC .............. G06Q 30/0202; G06F 18/214
See application file for complete search history.

(56) References Cited

U.S. PATENT DOCUMENTS

| | | |
|---|---|---|
| 5,752,237 A | 5/1998 | Cherny |
| 7,483,847 B1 | 1/2009 | Rymer et al. |
| 8,799,124 B1 | 8/2014 | Daken et al. |
| 8,805,844 B2 | 8/2014 | Schorzman et al. |
| 11,556,836 B1 | 1/2023 | Bao et al. |
| 2001/0037219 A1 | 11/2001 | Malik |
| 2002/0169652 A1 | 11/2002 | Busche |

(Continued)

OTHER PUBLICATIONS

University of Chicago, "Too Many Metrics: Measuring Social Media's Impact" (Year: 2016).*

(Continued)

*Primary Examiner* — Breffni Baggot
(74) *Attorney, Agent, or Firm* — Paradice & Li LLP

(57) ABSTRACT

Methods and systems for assisting entities with improving the effectiveness of their profiles are disclosed. An example method is performed by one or more processors of a system and includes storing profile data including profiles identifying attributes associated with respective entities, obtaining a selection data vector including values each indicating a selection rate for a respective entity, generating, using a trained analysis model, selection prediction data predicting, for each respective change of a set of possible changes to a selected entity's profile, how the selection rate for the selected entity will change if the selected entity's profile is adjusted in accordance with the respective change, selecting, from the selection prediction data, one or more recommended changes likely to result in an increase in the selection rate for the selected entity, and outputting a prompt recommending that the selected entity make one or more recommended changes to the selected entity's profile.

20 Claims, 6 Drawing Sheets

(56) References Cited

U.S. PATENT DOCUMENTS

| | | |
|---|---|---|
| 2005/0114279 A1 | 5/2005 | Scarborough et al. |
| 2006/0059021 A1 | 3/2006 | Yulman et al. |
| 2008/0222295 A1 | 9/2008 | Robinson et al. |
| 2009/0204531 A1 | 8/2009 | Johnson |
| 2009/0276340 A1 | 11/2009 | Knapp |
| 2011/0055035 A1 | 3/2011 | Koskay et al. |
| 2011/0119264 A1 | 5/2011 | Hu et al. |
| 2012/0330822 A1 | 12/2012 | McGovern et al. |
| 2013/0046704 A1 | 2/2013 | Patwa et al. |
| 2014/0195549 A1 | 7/2014 | Anh et al. |
| 2015/0127565 A1* | 5/2015 | Chevalier .............. G06Q 10/00 705/319 |
| 2016/0188587 A1 | 6/2016 | Martin et al. |
| 2017/0060982 A1 | 3/2017 | Akkiraju et al. |
| 2017/0091629 A1 | 3/2017 | Li et al. |
| 2017/0154314 A1 | 6/2017 | Mones et al. |
| 2017/0270156 A1 | 9/2017 | Ahire |
| 2017/0329856 A1 | 11/2017 | Jiang et al. |
| 2018/0150571 A1 | 5/2018 | Douglas et al. |
| 2019/0052720 A1 | 2/2019 | Guo et al. |
| 2019/0080347 A1* | 3/2019 | Smith ................ G06Q 30/0269 |
| 2020/0042610 A1* | 2/2020 | Boles ................ G06Q 30/0244 |

OTHER PUBLICATIONS

Affirmed PTAB decision U.S. Appl. No. 17/222,485 (Year: 2024).*

Approaches to Machine Learning, P. Langley at Carnegie-Mellon University (Year: 1984).*

Langley et al., "Approaches to Machine Learning," Carnegie-Mellon University, Pittsburgh, PA, Department of Computer Science, Feb. 16, 1984, 28-pages (Year: 1984).

Manongdo et al., "Applying Client Churn Prediction Modeling on Home-Based Care Services Industry," 2016 International Conference on Behavioral, Economic and Socio-Cultural Computing (BESC), 2016, pp. 1-6, doi: 10.1109/BESC.2016.7804503 (Year: 2016).

Quotify Technology, Inc., www.quotify.com, 2011, 2-pages.

Shirazi et al., "A Framework for Combined Bayesian Analysis and Optimization for Services Delivery," 2009 IEEE/INFORMS International Conference on Service Operations, Logistics and Informatics, 2009, pp. 382-387, doi: 10.1109/SOLI.2009.5203963 (Year: 2009).

Vafaie et al., "Selection Process of Intelligent Decision Support Tool for Real-Time Monitoring System," 14th IEEE International Conference on Tools with Artificial Intelligence, 2002. (ICTAI 2002). Proceedings., 2002, pp. 173-180, doi: 10.1109/TAI.2002.1180802. (Year: 2002).

* cited by examiner

ATTRIBUTE SELECTION FOR MATCHMAKING

CROSS-REFERENCE TO RELATED APPLICATION

This application is a continuation application and claims priority to U.S. patent application Ser. No. 16/059,482 entitled "SYSTEM AND METHOD FOR ATTRIBUTE SELECTION FOR EXPERT MATCHMAKING" and filed on Aug. 9, 2018, which is assigned to the assignee hereof. The disclosures of all prior applications are considered part of and are incorporated by reference in this patent application.

TECHNICAL FIELD

This disclosure relates generally to matchmaking, and specifically to attribute selection for matchmaking.

BACKGROUND

Many individuals, businesses, and organizations around the world use electronic data management systems, such as electronic accounting systems, to help manage their finances. Electronic bookkeeping systems use accounts for categorization of business transactions. Such electronic bookkeeping systems gather data related to financial transactions of their users. The users can then sort the financial transactions into the various accounts in order to track their expenditures and revenues by category. The users can monitor many or all of their financial transactions and other financial matters from a single electronic bookkeeping system and sort them into the various financial accounts. Such an electronic bookkeeping system can help users to save time by eliminating the need to check with several different financial institutions in order to manage their finances.

Nevertheless, in some instances users of data management systems may need the additional assistance of a human expert. Some data management systems maintain affiliation with a number of experts. When users need the assistance of an expert, the users can perform a search for an expert on a search platform provided by the data management system. The users can enter a search query and the search platform can return a series of expert profiles. The users can then select an expert based on the expert profiles.

In many instances, experts affiliated with a data management system find that they rarely or never are selected by users of the data management system. Often the experts do not know why they are rarely selected or how they can improve the situation. Traditional data management systems are unable to provide effective assistance to the experts.

The inability of traditional data management systems to assist experts to improve the rate at which they are selected by users results in serious problems for the experts, for the users, and for the traditional data management systems. The experts lose income, the users miss out on finding suitable experts, and the data management system loses affiliated experts and users. Furthermore, these problems result in inefficient use of computing system resources. Experts spend many hours fruitlessly trying to improve their profiles and users spend large amounts of time searching for experts. Each of these activities can use large amounts of processing, memory, and data transmission resources.

What is needed is a method and system that provide a technical solution to the long-standing technical problem of providing data management systems that dynamically assist experts to improve the rate at which users select to access their services.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for assisting entities with improving the effectiveness of their profiles. An example method is performed by one or more processors of a system and includes storing profile data in a profile database of the system, the profile data including, for each respective entity of a plurality of entities associated with the system, a profile identifying attributes associated with the respective entity, obtaining, from the profile database using the one or more processors, a selection data vector including values each indicating a selection rate for a respective entity, each selection rate indicative of a rate at which users of the system have chosen to receive services from the respective entity after selecting the respective entity's profile, generating, for a selected entity associated with a user computing environment used to interact with the system, selection prediction data for the selected entity by analyzing, using an analysis model, the profile data associated with the selected entity, the selection prediction data predicting, for each respective change of a set of possible changes to the selected entity's profile, how the selection rate for the selected entity will change if the selected entity's profile is adjusted in accordance with the respective change, where the analysis model is trained, using a model training module in conjunction with a machine learning process, to predict how changes in a profile of a given entity will affect the selection rate for the given entity based on feeding the profile data associated with the given entity to the analysis model and comparing the values included in the selection data vector with selection rates included in a selection rate vector generated for the plurality of entities based on the attributes, and where the analysis model is retrained, using the model training module in conjunction with the machine learning process, until a difference between the values included in the selection data vector and the values included in the selection rate vector is below a threshold, selecting, from the selection prediction data, one or more recommended changes likely to result in an increase in the selection rate for the selected entity, and outputting, to the selected entity via an interface module communicatively coupled to the user computing environment, recommended profile adjustment data including a prompt recommending that the selected entity make at least one of the one or more recommended changes to the selected entity's profile.

Another innovative aspect of the subject matter described in this disclosure can be implemented in a system for assisting entities with improving the effectiveness of their profiles. An example system includes one or more processors and a memory storing instructions for execution by the one or more processors. Execution of the instructions causes the system to perform operations including storing profile data in a profile database of the system, the profile data including, for each respective entity of a plurality of entities associated with the system, a profile identifying attributes associated with the respective entity, obtaining, from the profile database using the one or more processors, a selection data vector including values each indicating a selection rate for a respective entity, each selection rate indicative of a rate at which users of the system have chosen to receive services from the respective entity after selecting the respective entity's profile, generating, for a selected entity associated with a user computing environment used to interact with the system, selection prediction data for the selected entity by analyzing, using an analysis model, the profile data associated with the selected entity, the selection prediction data predicting, for each respective change of a set of possible changes to the selected entity's profile, how the selection rate for the selected entity will change if the selected entity's profile is adjusted in accordance with the respective change, where the analysis model is trained, using a model training module in conjunction with a machine learning process, to predict how changes in a profile of a given entity will affect the selection rate for the given entity based on feeding the profile data associated with the given entity to the analysis model and comparing the values included in the selection data vector with selection rates included in a selection rate vector generated for the plurality of entities based on the attributes, and where the analysis model is retrained, using the model training module in conjunction with the machine learning process, until a difference between the values included in the selection data vector and the values included in the selection rate vector is below a threshold, selecting, from the selection prediction data, one or more recommended changes likely to result in an increase in the selection rate for the selected entity, and outputting, to the selected entity via an interface module communicatively coupled to the user computing environment, recommended profile adjustment data including a prompt recommending that the selected entity make at least one of the one or more recommended changes to the selected entity's profile.

Another innovative aspect of the subject matter described in this disclosure can be implemented as a non-transitory computer-readable medium storing instructions that, when executed by one or more processors of a system for assisting entities with improving the effectiveness of their profiles, cause the system to perform operations. Example operations include storing profile data in a profile database of the system, the profile data including, for each respective entity of a plurality of entities associated with the system, a profile identifying attributes associated with the respective entity, obtaining, from the profile database using the one or more processors, a selection data vector including values each indicating a selection rate for a respective entity, each selection rate indicative of a rate at which users of the system have chosen to receive services from the respective entity after selecting the respective entity's profile, generating, for a selected entity associated with a user computing environment used to interact with the system, selection prediction data for the selected entity by analyzing, using an analysis model, the profile data associated with the selected entity, the selection prediction data predicting, for each respective change of a set of possible changes to the selected entity's profile, how the selection rate for the selected entity will change if the selected entity's profile is adjusted in accordance with the respective change, where the analysis model is trained, using a model training module in conjunction with a machine learning process, to predict how changes in a profile of a given entity will affect the selection rate for the given entity based on feeding the profile data associated with the given entity to the analysis model and comparing the values included in the selection data vector with selection rates included in a selection rate vector generated for the plurality of entities based on the attributes, and where the analysis model is retrained, using the model training module in conjunction with the machine learning process, until a difference between the values included in the selection data vector and the values included in the selection rate vector is below a threshold, selecting, from the selection prediction data, one or more recommended changes likely to result in an increase in the selection rate for the selected entity, and outputting, to the selected entity via an interface module communicatively coupled to the user computing environment, recommended profile adjustment data including a prompt recommending that the selected entity make at least one of the one or more recommended changes to the selected entity's profile.

Embodiments of the present disclosure address some of the shortcomings associated with traditional data management systems. Profile adjustments are identified and recommended based on machine learning processes. Therefore, the various described embodiments of the disclosure and their associated benefits amount to significantly more than an abstract idea. In particular, by utilizing machine learning processes to generate profile adjustment recommendation data, the effectiveness and efficiency of the data management system is greatly improved.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Figure 1:
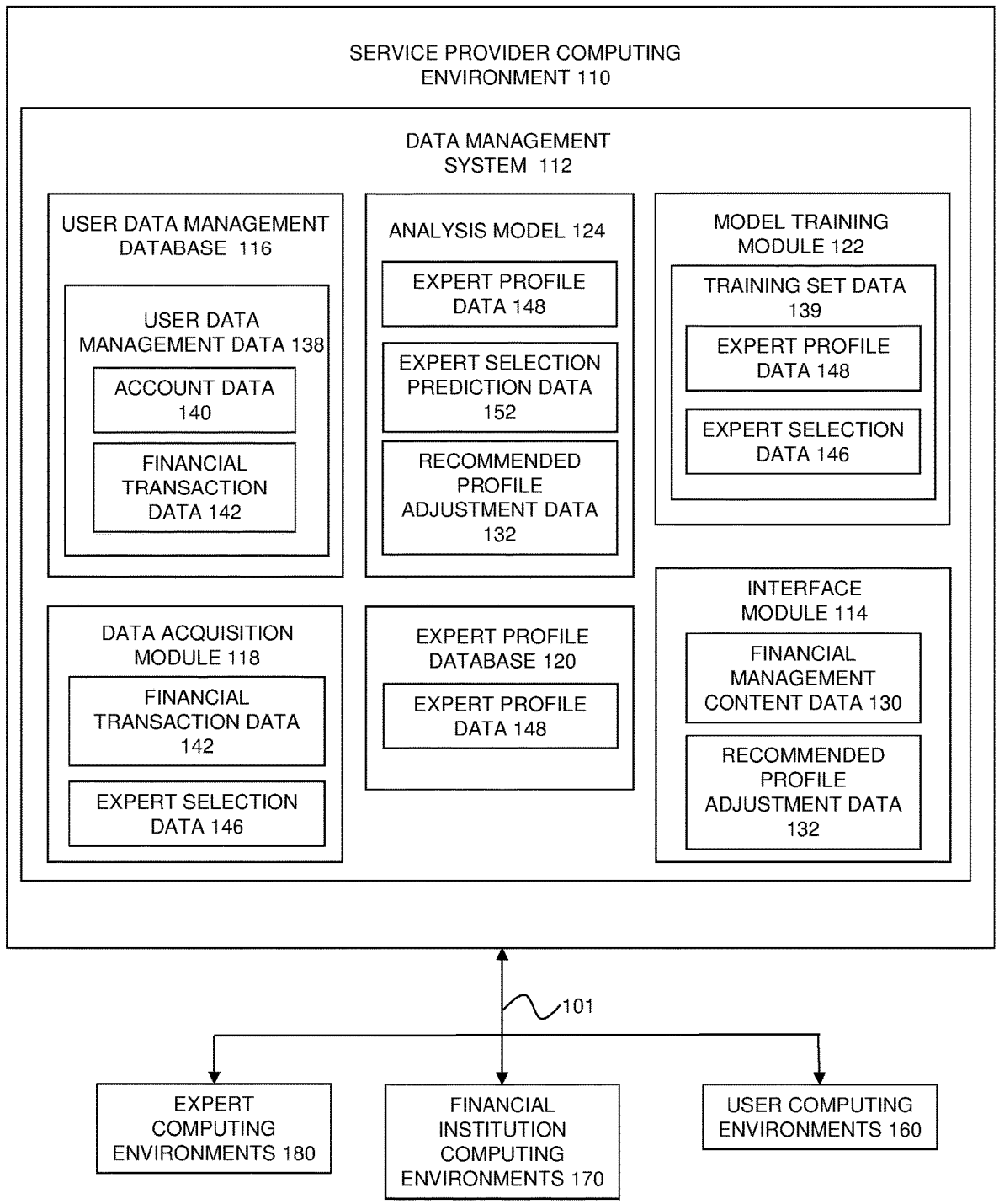
FIG. 1 is a block diagram of a system for assisting experts associated with a data management system to improve the effectiveness of their profiles, in accordance with one embodiment.

FIG. 1 illustrates a block diagram of a production environment 100 for assisting experts associated with a data management system to improve the effectiveness of their profiles, according to one embodiment. Embodiments of the present disclosure train, with a machine learning process, an analysis model to predict how changes in a profile of an expert will affect the selection rate for the expert. Embodiments of the present disclosure pass expert profile data associated with the expert to the analysis model. Embodiments of the present disclosure generate expert selection prediction data for the expert by analyzing, with the analysis model, the expert profile data associated with the expert. The expert selection prediction data predicts how the selection rate for the expert will change based on changes to the profile of the selected expert. Embodiments of the present disclosure select, from the expert selection prediction data, one or more changes likely to result in an increase in the selection rate for the selected expert. Embodiments of the present disclosure output recommended profile adjustment data to the expert.

The disclosed method and system for assisting experts associated with a data management system to improve the effectiveness of their profiles provides for significant improvements to the technical fields of data processing, data management, and user experience.

In addition, as discussed above, the disclosed method and system for assisting experts associated with a data management system to improve the effectiveness of their profiles provide for the processing and storage of smaller amounts of data, i.e., more efficiently provide data management services; thereby eliminating unnecessary data analysis and storage. Consequently, using the disclosed method and system for assisting experts associated with a data management system to improve the effectiveness of their profiles results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for assisting experts associated with a data management system to improve the effectiveness of their profiles.

The production environment 100 includes a service provider computing environment 110, user computing environments 160, financial institution computing environments 170, and expert computing environments 180, for assisting experts associated with a data management system to improve the effectiveness of their profiles, according to various embodiments. The computing environments 110, 160, 170, and 180 are communicatively coupled to each other with one or more communication channels 101, according to various embodiments.

The service provider computing environment 110 represents one or more computing systems such as one or more servers and/or distribution centers that are configured to receive, execute, and host one or more data management systems (e.g., applications) for access by one or more users, for assisting experts associated with a data management system to improve the effectiveness of their profiles, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a data management system 112, which is configured to provide data management services to a plurality of users and to match users to data management experts, according to one embodiment.

According to one embodiment, the data management system 112 is an electronic bookkeeping accounting system that assists users in bookkeeping or other financial accounting practices. Additionally, or alternatively, the data management system can manage one or more of tax return preparation, banking, investments, loans, credit cards, real estate investments, retirement planning, bill pay, and budgeting. The data management system 112 can be a standalone system that provides data management services to users. Alternatively, the data management system 112 can be integrated into other software or service products provided by a service provider.

In one embodiment, the data management system 112 can assist users in tracking expenditures and revenues by retrieving financial transaction data related to financial transactions of users and by enabling the users to sort the financial transactions into accounts. Each user can have multiple accounts into which the user's financial transactions can be sorted. The data management system 112 enables the users to generate and name their various accounts and to use the accounts for their own financial tracking purposes.

In one embodiment, the data management system 112 partners with experts in the field of the data management system 112. While the data management system 112 is very helpful in assisting users with data management services, in some cases users may need the additional advice or services of human experts. In this case, the users can perform a search on a search platform provided by the data management system 112. A search engine returns search results including multiple experts. Each expert has a profile including attributes associated with the expert. The users can peruse the profiles and select an expert based on the of the expert.

In some cases, experts that have partnered with the data management system 112 have profiles that are deficient or that otherwise can be improved in order to assist the experts in attracting more users to retain the services of the experts. The data management system 112 can assist the experts to adjust and refine their profiles in order to assist the experts to attract more users.

In one embodiment, the data management system 112 includes an analysis model configured to analyze the profile of an expert and to determine what adjustments can be made to the profile in order to make the profile more effective. The data management system leverages the fact that the data management system includes the profile data associated with a large number of experts, as well as selection rate data indicating how many users have accessed the services of each expert. The data management system trains the analysis model with a machine learning process to learn the relationships between the various attributes in the expert profiles and the selection rates associated with each expert. After the machine learning process has trained the analysis model to accurately reproduce the selection rate observed for each expert based on the attributes included in the expert profile associated with the expert, the analysis model can assist the experts to improve their profiles.

In one embodiment, once the analysis model has been trained, the data management system passes the expert profile data associated with an expert to the analysis model. The analysis model processes the expert profile data by making iterative adjustments to the attributes associated with the profile and predicting what the selection rate would be with each adjustment. The analysis model generates expert selection prediction data identifying the predicted selection rate based on the various adjustments to the attributes of the profile. The analysis model selects one or more adjustments that result in the largest predicted selection rate. The analysis model then generates recommended profile adjustment data including the one or more selected adjustments. The data management system then outputs the recommended profile adjustment data to the expert. The expert can then make adjustments to the profile in order to improve the likelihood that users will choose to access the services of the expert.

In one embodiment, the data management system 112 includes an interface module 114, a user data management database 116, a data acquisition module 118, an expert profile database 120, a model training module 122, and an analysis model 124, according to various embodiment.

The user computing environments 160 correspond to computing environments of the various users of the data management system 112. The users of the data management system 112 utilize the user computing environments 160 to interact with the data management system 112. The users of the data management system 112 can use the user computing environments 160 to provide data to the data management system 112 and to receive data, including data management services, from the data management system 112.

In one embodiment, the users of the data management system 112 can include companies, businesses, organizations, government entities, individuals, groups of individuals, or any other entities for which data management services would be beneficial, according to one embodiment. Businesses of all kinds, including large corporations, midsize companies, small businesses, or even sole proprietor businesses, can utilize the data management system 112 to track and sort their financial transactions into various accounts as a way to better manage their finances. Likewise, government organizations may use the data management system 112 to sort their financial transactions into accounts in order to track various types of expenditures and revenues. Organizations other than businesses and government entities, such as nonprofit organizations, may also utilize the data management system 112 for the purpose of monitoring and sorting expenditures and revenues. Furthermore, individuals may utilize the data management system 112 to track their own revenues and expenditures. Thus, the term "user" can refer to many types of entities.

Returning to the data management system 112, the user interface module 114 is configured to receive user data from the users, according to one embodiment. The user data includes information, such as, but not limited to a name of a business, and address of a business, data related to individuals associated with the business, employee data, payroll data, authentication data that enables the user to access the data management system, or any other types of data that a user may provide in working with the data management system 112.

In one embodiment, the user data can include financial institution authentication data that enables the data management system 112 to access the financial accounts that the user has with third-party financial institutions or other third-parties. In one embodiment, the financial institution authentication data provided by the users as part of the user data enables the data management system 112 to acquire information related to financial transactions of the users. The financial institution authentication data can include data that allows the data management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data of user data can include usernames, passwords, bank account numbers, routing numbers, credit card numbers, answers to security questions, identification numbers, government identification numbers, birth dates, addresses, or other types of verification credentials that allow the data management system 112 to gain access to online services of third-party financial service institutions.

In one embodiment, the user data can also include data provided by the users to create and name the various accounts that the users will use to sort and categorize financial transactions. These accounts can correspond to categories of revenues or expenses of the users into which financial transactions of the users can be sorted. The users can generate the accounts so that the data management system 112 can assist the users in better managing their finances.

In one embodiment, the user interface module 114 provides financial management content data 130 to the user computing environments 160. The financial management content data 130 can include data enabling a user to obtain the current status of the user's accounts. For example, the financial management content data 130 can enable the user to select among the user's accounts in order to view financial transactions associated with the user's accounts. The financial management content data 130 can enable a user to view the overall state of many accounts. The financial management content data 130 can also enable a user to select among the various options in the data management system in order to fully utilize the services of the data management system. The user can provide user data in conjunction with the financial management content data 130 in order to sort financial transactions of the user into the user's accounts.

In one embodiment, the data management system 112 includes a user data management database 116. The user data management database 116 includes the user data management data 138. The user data management data 138 can include data indicating the current status of all of the accounts of all of the users of the data management system. Thus, the user data management database 116 can include a vast amount of data related to the data management services provided to users. In one embodiment, when the user utilizes the interface module 114 to view financial management content data 130, the financial management content data 130 includes user data management data 138 retrieved from the user data management database 116.

In one embodiment, the user data management data 138 includes account data 140 and financial transaction data 142. The user data management data 138 can include, for each account of each user, a list of the financial transactions associated with the account. Thus, the user data management data 138 can include a large number of accounts and a large number of financial transactions that have been sorted into each account.

In one embodiment, each financial transaction in the user data management data 138 includes merchant identification data that identifies the merchant or vendor involved in the financial transaction. In one example, a particular user has an account for expenses related to food provided to employees during lunch meetings, for special occasions, for office parties, etc. The merchant identification data for these financial transactions may identify various restaurants, bakeries, grocery stores, and caterers. These restaurants, bakeries, grocery stores, and caterers are the merchants or vendors associated with the financial transactions associated with that account.

In one embodiment, the data acquisition module 118 is configured to use the financial institution authentication data provided in the user data to acquire financial transaction data 142 related to financial transactions of the users from the financial institution computing environments 170. In particular, the data acquisition module 118 uses the financial institution authentication data to log into the online services of third-party financial institutions in order to retrieve financial transaction data 142 related to the financial transactions of users of the data management system 112. The data acquisition module 118 accesses the financial institutions by interfacing with the financial institution computing environments 170. The financial transaction data 142 can include bank account deposits, bank account withdrawals, credit card transactions, credit card balances, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, or any other types of financial transactions. The data acquisition module 118 is configured to gather the financial transaction data 142 from financial institution computing environments 170 related to financial service institutions with which one or more users of the data management system 112 have a relationship.

In one example, the data acquisition module 118 uses the financial institution authentication data to acquire data related to withdrawals, deposits, and balances in the bank accounts of users. The financial transaction data 142 includes data related to these withdrawals, deposits, and balances. Accordingly, the financial institution authentication data of user data can include usernames, passwords, bank account numbers, routing numbers, or other validation credentials needed to access online services of various banking institutions.

In one embodiment, the financial transaction data 142 includes merchant identification data. Each financial transaction received in the financial transaction data 142 can include a merchant identification indicated by the merchant identification data. The data management system 112 can use the merchant identification data to assist the users in sorting their financial transactions into the various accounts of the users.

In one embodiment, the merchant identification data includes a merchant string. The merchant string can include a data string associated with a credit card transaction, a bank transaction, a checking account transaction, an online payment transaction, or other kinds of financial transactions. The merchant string for a given financial transaction may include a name of the merchant involved in the financial transaction, a part of the name of the merchant, a code associated with the merchant, an address associated with the merchant, or other types of data that can potentially identify the merchant.

In one embodiment, the data acquisition module 118 is configured to acquire data from third-party computing environments. The data acquisition module 118 can request and receive data from the third-party computing environments to supply or supplement the financial transaction data 142, according to one embodiment. In one embodiment, the third-party computing environments automatically transmit financial data to the data management system 112 (e.g., to the data acquisition module 118), to be merged into the financial transaction data 142. The third-party computing environment can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In spite of the many automated benefits provided by the data management system 112, there are circumstances in which users of the data management system 112 may need to access the services of an expert in the field of the data management system 112. For example, in an example in which the data management system 112 is a bookkeeping system, the experts can include accountants, accounting firms, tax experts, tax attorneys, or tax law firms. The data management system 112 can assist the users of the data management system 112 to find experts that match the needs of the users.

In one embodiment, the data management system 112 is affiliated with a large number of experts. The experts can be employees of an organization that implements the data management system 112. The experts can have a contractual relationship with the organization that operates the data management system 112. Additionally, or alternatively, the experts can pay the organization that operates the data management system 112 in order to be affiliated with the data management system 112.

In one embodiment, the data management system 112 includes an expert profile database 120. The expert profile database 120 includes expert profile data 148. The expert profile data 148 includes an expert profile for each expert affiliated with the data management system 112. The expert profile database 120 is searchable so that users can search the data management system 112 for experts who will suit the particular needs of the users.

In one embodiment, the data management system 112 enables each expert to generate and modify their own expert profile. An expert that becomes affiliated with the data management system 112 can provide or generate a profile and store the profile in the expert profile database 120. In this way, each user can generate, provide, or upload their own expert profile.

In one embodiment, each expert profile includes a plurality of attributes associated with the expert profile. The attributes of the expert profile can include attributes of the user and attributes associated with a style or presentation of the expert profile. The user that accesses the profile of an expert can see the attributes associated with the expert profile.

In one embodiment, each expert profile can include a large number of attributes. The attributes of the expert profile can include a profile picture. The profile picture can include a picture of an individual that is the expert. In the example in which the expert is an organization or firm, the profile can include multiple profile pictures of individuals associated with the organization or firm.

In one embodiment, the attributes of an expert profile can include a name associated with the expert. In an example in which the expert is an individual, the attributes can include a name of the individual. In an example in which the expert is an organization, the attributes can include a name of the organization. Additionally, or alternatively, the attributes can include the names of multiple individuals associated with an organization.

In one embodiment, the attributes of an expert profile can include a geolocation associated with the expert. The geolocation can indicate the location of an office associated with the expert. The attributes can include multiple geolocations associated with various individuals associated with an organization corresponding to the expert. The geolocation can include a street address.

In one embodiment, the attributes of an expert profile can include contact information. The contact information can include one or more of a phone number, an email address, and a fax number. The contact information can include operating hours associated with the expert.

In one embodiment, the attributes of an expert profile can include one or more areas of specialty associated with the expert. In an example in which the expert is an accountant, the attributes can indicate the particular areas of accounting in which the expert specializes.

In one embodiment, the attributes of an expert profile can include awards or accolades associated with the expert. The awards or accolades correspond to the professional field of the expert. The awards or accolades can include whether an organization has rated the expert as a top expert in a particular field, as having excellent customer service, or other types of awards or accolades.

In one embodiment, the attributes of an expert profile can include professional credentials associated with the expert. For example, the expert profile can identify institutions or organizations with which the expert is officially credentialed. In an example in which the expert is an accountant, the professional credentials can indicate whether the professional is a certified public accountant (C.P.A.) and whether the accountant is a member in good standing with various governing bodies and organizations.

In one embodiment, the attributes of an expert profile can include academic history associated with the expert. The academic history can include schools attended by the expert, schools from which the expert has earned a degree, grade-point averages of the expert, whether the experts graduated with honors, or other aspects associated with an academic history of an expert.

In one embodiment, the attributes of an expert profile can include a length of time during which the expert has practiced in a professional field. For example, if the expert is an accountant, then the expert profile can include data indicating how long the expert has been an accountant.

In one embodiment, the attributes of an expert profile can include customer testimonials associated with the expert. When users access the services of the expert, the users can provide testimonials indicating how the users evaluated the services provided by the expert. The expert can include these testimonials in the expert profile.

In one embodiment, the attributes of an expert profile can include an aggregated rating associated with the expert. Users that have accessed the services of the expert can provide a rating for the services provided by the expert. The user profile can include an aggregated rating indicating an average or median rating provided by users that have accessed the services provided by the expert.

In one embodiment, the attributes of an expert profile can include a text font associated with the profile. In one embodiment, experts can choose the fonts in which text will be displayed in the expert profile. The attributes can include a writing style, a font size, a font style, or other aspects of text displayed in the expert profile.

In one embodiment, the attributes of an expert profile can include how images and text are arranged in the expert profile. In one embodiment each expert can choose how the text and graphics associated with the profile are arranged and presented.

In one embodiment, the data management system 112 includes a search engine. Users can access the search engine in order to search for an expert. Users can enter query data including one or more search terms. The search terms can include a geolocation for desired services, a professional field associated with desired services, a name associated with an expert, or other search terms that can help a user find an expert that has the credentials or attributes desired by the user.

In one embodiment, the data management system 112 returns search results in response to the query data provided by the user. The search results include one or more expert profiles selected from the expert profile data 148 based on the search terms included in the query data. The search engine seeks to provide expert profiles that most closely match the attributes indicated in the search terms of the query data.

In one embodiment, users may glance through the profiles of various experts returned in the search results. If the user finds an expert profile that indicates that the expert is a good match for the needs of the user, then the user may select that expert profile. Selecting the expert profile may provide the user with more detailed profile information. The user may seek to access the services of the expert by calling or emailing the expert.

In some cases, an expert will be suitable for the needs of user, however the profile of the expert may be deficient or otherwise off-putting to the user. In this case, the user may decide that the expert is not a good match for the user based on the profile of the expert even though the expert is in fact a good match for the user. This can be highly detrimental to experts who rely on business generated through the data management system 112. This can also be highly detrimental to the users as they may decide that the data management system 112 cannot provide them with the assistance that they need.

In one embodiment, the data management system 112 gathers or retains expert selection data 146. The expert selection data 146 includes, for each expert, a respective selection rate. The selection rate for an expert indicates a rate at which users selected the profile or selected to receive services from the expert. The selection rate can include a raw number indicating the total number of users that selected the profile or the services of the expert. An expert that has been affiliated with the data management system 112 for a long period of time could include a higher total number of users that have accessed the profile or services of the expert. An expert that has been affiliated with the data management system 112 for a shorter period of time could have a lower total number of users that have accessed the profile or services of the expert, but a higher frequency with which users have accessed the profile or services of the user. Accordingly, to avoid undue bias toward experts that have been longer affiliated with the data management system 112, the selection rate can include the number of users that selected the profile or the services of the expert in a selected time period. For example, the selection rate for each expert can include the number of users that accessed the profile or services of the expert in a fixed most recent period of time. The period of time can be a selected number of days, weeks, months, or years according to various embodiments.

In one embodiment, in order to assist experts to generate profiles that are more effective in attracting the attention of users, the data management system 112 includes a model training module 122 and an analysis model 124. The data management system utilizes the model training module 122 to train the analysis model 124 to predict how changes in the attributes of an expert profile will affect the selection rate associated with the expert.

In one embodiment, the model training module 122 gathers training set data 139. The training set data 139 includes expert profile data 148 and expert selection data 146. The model training module 122 utilizes machine learning processes to train the analysis model 124 to accurately reproduce the selection rate for each expert based on the attributes included in the profile of the expert.

In one embodiment, the model training module 122 utilizes a supervised machine learning process in order to train the analysis model 124. In the supervised machine learning process, the model training module 122 knows the desired output, i.e. the correct selection rate for each expert because the training set data 139 includes the expert selection data 146. Thus, the supervised machine learning process uses as input, the expert profile data 148, and compares the output to the known expert selection data 146.

In one embodiment, the analysis model 124 learns one or more functions that, when attributes of a profile are used as input, outputs an accurate selection rate. Thus, the one or more functions are functions of the attributes and the one or more functions output a selection rate based on the input attributes.

In one embodiment, the analysis model 124 utilizes a linear regression model. The linear regression model can include a linear approach to modelling the relationship between a scalar response (or dependent variable) and one or more explanatory variables (or independent variables).

In linear regression, the relationships are modeled using linear predictor functions whose unknown model parameters are estimated from the data. In one example, the conditional mean of the response given the values of the explanatory variables (or predictors) is assumed to be an affine function of those values. In another example, the conditional median or some other quantile can be used. The linear regression model can focus on the conditional probability distribution of the response given the values of the predictors, rather than on the joint probability distribution of all of these variables.

In one embodiment, the analysis model 124 utilizes a naïve bayes analysis model. In one embodiment, the analysis model 124 utilizes a Latent Dirichlet Allocation (LDA) model. In one embodiment, the analysis model 124 utilizes a logistic regression model. In one embodiment the analysis model 124 utilizes a random forest model. In one embodiment, the analysis model 124 utilizes a decision tree model. In one embodiment, the analysis model 124 utilizes an inductive logic programming analysis model.

In one embodiment, the model training module 122 utilizes an unsupervised machine learning process to train the analysis model 124. In one embodiment, the model training module 122 utilizes a combination of unsupervised and supervised machine learning processes. In one embodiment, the model training module 122 utilizes a deep learning unsupervised machine learning process.

In one embodiment, after the analysis model 124 has been trained, the analysis model 124 is able to assist experts to improve the effectiveness of their profiles. In particular, the analysis model 124 analyzes an expert profile associated with an expert and identifies changes to the attributes of the expert profile that are likely to result in an increase in the selection rate associated with the expert. In this way, the analysis model 124 assists experts to improve the effectiveness of their profiles.

In one embodiment, the analysis model 124 receives expert profile data 148 associated with a selected expert. The selected expert corresponds to an expert for which the analysis model 124 will perform analysis to assist the expert to improve the profile of the expert. The analysis model 124 analyzes the expert profile associated with the selected expert and identifies adjustments to the expert profile that are likely to result in an increase in the selection rate associated with the selected expert.

In one embodiment, the analysis model 124 generates, for the selected expert, expert selection prediction data 152. The expert selection prediction data 152 includes a set of predicted selection rates. Each predicted selection rate is based on an adjustment to one or more of the attributes associated with the expert profile of the selected expert. Because the analysis model 124 has been trained with the machine learning process to learn the functions that accurately predict selection rates based on input attributes, the analysis model 124 can artificially adjust the attributes in order to generate predicted selection rates based on the adjustments to the attributes.

In one embodiment, the analysis model 124 iteratively adjusts the attributes of the expert profile. For each iteration of the adjusted attributes, the analysis model 124 generates predicted selection rates. By the time the analysis model 124 has gone through all of the iterations of adjustments to the attributes, the analysis model 124 has generated expert selection prediction data 152 that includes a large number of predicted selection rates.

In one embodiment, the analysis model 124 adjusts a single attribute in each iteration and generates predicted selection rate data for the adjustment of the single attribute. The analysis model 124 can adjust the same attribute in multiple iterations, in different manners, or in varying degrees. The analysis model 124 generates a predicted selection rate for each iteration. When the analysis model 124 has performed various iterations of adjustments to a given attribute, the analysis model can move on to a different attribute and can generate various iterations of adjustments to the different attribute. The analysis model 124 can cycle through iterative adjustments to all of the attributes of the expert profile and can generate predicted selection rates for each iteration.

In one embodiment, the analysis model 124 adjusts multiple attributes in some iterations and generates predicted selection rate data for the adjustment of the multiple attributes. Thus, a single iteration can include adjustments to multiple attributes in order to identify how the selection rate would change based on adjustments to multiple attributes.

In one embodiment, after the analysis model 124 has generated expert selection prediction data 152, the analysis model 124 generates recommended profile adjustment data 132. In particular, the analysis model 124 analyzes the expert selection prediction data 152 in order to identify which adjustments resulted in the largest increase in the predicted selection rate for the selected expert. The analysis model 124 generates the recommended profile adjustment data 132 indicating one or more adjustments that would result in the largest predicted selection rate for the selected expert.

In one embodiment, the interface module 114 outputs the recommended profile adjustment data 132 to the selected expert. The selected expert can receive the recommended profile adjustment data 132 via the expert computing environments 180. The expert, or individual associated with the expert can see what adjustments to the expert's profile are recommended. The recommended profile adjustment data 132 can also indicate how the recommended adjustments are predicted to affect the selection rate associated with the selected expert.

In one embodiment, the recommended profile adjustment data can include one or more links that enable the selected expert to quickly access those attributes of the profile for which adjustments are recommended. This enables the selected expert to quickly adjust the attributes in the recommended manner. In one embodiment, the recommended profile adjustment data 132 can include a prompt asking the user to approve the data management system 112 in automatically adjusting the attributes of the selected expert's profile in the suggested manner.

In one embodiment, the recommended profile adjustment data 132 recommends three or more adjustments likely to result in a greatest increase in the selection rate for the selected expert. In one embodiment, the recommended profile adjustment data 132 lists recommended adjustments in order of likelihood of greatest increase to the selection rate.

In one embodiment, the one or more recommended adjustments include deleting an attribute that currently exists in the profile of the selected expert. In one embodiment, the one or more recommended adjustments include adding an attribute that does not currently exist in the profile of the selected expert. In one embodiment, the one or more changes include modifying an attribute that currently exists in the profile of the selected expert.

In one example, according to one embodiment, a recommended adjustment could include adding a profile picture, removing a profile picture, revising a profile picture, adding academic history information, revising academic history information, removing academic history information, adding awards and accolades information, revising awards and accolades information, deleting awards and accolades information, adding contact information, revising contact information, deleting contact information, adding geolocation information, revising geolocation information, deleting geolocation information, adding selected text, revising selected text, deleting selected text, changing the font associated with selected text, adjusting an arrangement of text, adjusting an arrangement of graphics, or many other kinds of possible adjustments to profile of an expert.

In one embodiment, the attributes of the profile include the sentiment of the profile, including the wording of the profile. The attributes can include whether customer reviews included in the profile are negative. The attributes can include whether the expert has replied to the negative review or otherwise attempted to address the negative review. Recommended changes can include adjusting the sentiment in the text, addressing negative reviews, seeking additional reviews of a particular type so that the expert can be categorized as belonging to a particular industry or specialization.

In one embodiment, the data management system 112 periodically analyzes each expert profile with the analysis model 124 in order to determine if there are adjustments that can be recommended to the expert in order to improve the selection rate of the expert. In one embodiment, the data management system 112 can analyze each expert profile with a selected periodicity. The selected periodicity can include analyzing each expert profile every year, every half year, every month, every two weeks, every week, or every day. In one embodiment, the analysis model can selectively analyze expert profiles based on how low the selection rates are for the expert profiles. Low selection rates can be singled out for analysis.

In one embodiment, the data management system 112 periodically retrains the analysis model 124 with the model training module 122. The model training module 122 can retrain the analysis model 124 with a selected periodicity. The selected periodicity can include retraining the analysis model 124 every year, every half year, every month, every two weeks, every week, or every day.

Figure 2:
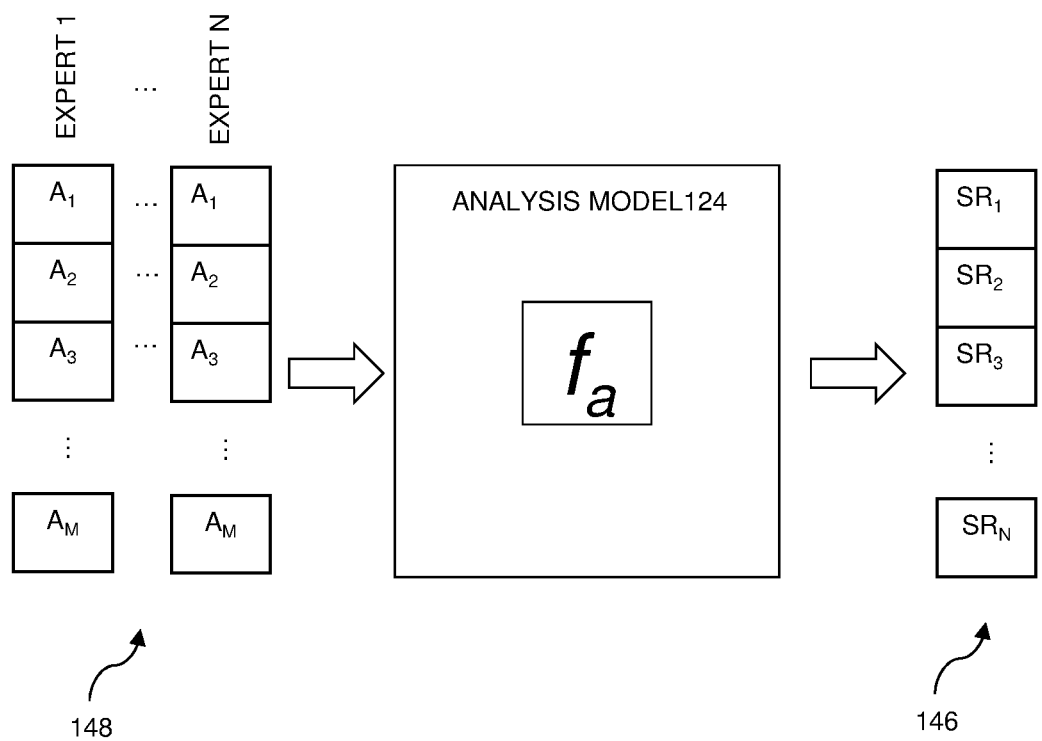
FIG. 2 is a block diagram of a system for training an analysis model to assist experts associated with a data management system to improve the effectiveness of their profiles, in accordance with one embodiment.

FIG. 2 is a block diagram 200 of a process for training an analysis model to assist experts associated with a data management system to improve the effectiveness of their profiles, in accordance with one embodiment.

In one embodiment, the process for training the analysis model 124 includes passing expert profile data 148 into the analysis model 124. The expert profile data 148 includes expert profile data for each of N experts affiliated with the data management system 112, generating test selection rate data by executing one or more formulas f(a) based on the attributes included in the profiles of the experts, and comparing the test selection rate data to the expert selection data 146. After each time the test selection rate data is generated and compared to the expert selection data 146, the model training module 122 adjusts the one or more functions f(a) in accordance with a machine learning process until the functions generates test selection rate data that consistently matches the expert selection data 146.

In one embodiment, each expert profile in the expert profile data 148 corresponds to a data set with a number of attributes corresponding to the attributes of the expert profile. In the example of FIG. 2, each expert profile data set includes attributes A1-AM. Thus, each data set includes M attributes. The attributes can correspond to the attributes set forth above in relation to FIG. 1, or other types of attributes that could be included in an expert profile.

In one embodiment, the expert profile data 148 includes, for each expert, a vector of length M. The expert profile data 148 can be passed into the analysis model 124 as a series of the vectors, or as a matrix made up of the vectors.

In one embodiment, the expert selection data 146 is arranged as a data set that includes a selection rate (SRx) for each of the N experts. In one embodiment, the expert selection data 146 includes a vector of length N. The data values of the vector are the selection rates for the N experts. The test selection rates can also be generated in a vector. The model training module 122 can train the analysis model 124 until the difference between the expert selection data vector and the test selection rate vector is minimized or is smaller than a selected threshold.

Figure 3:
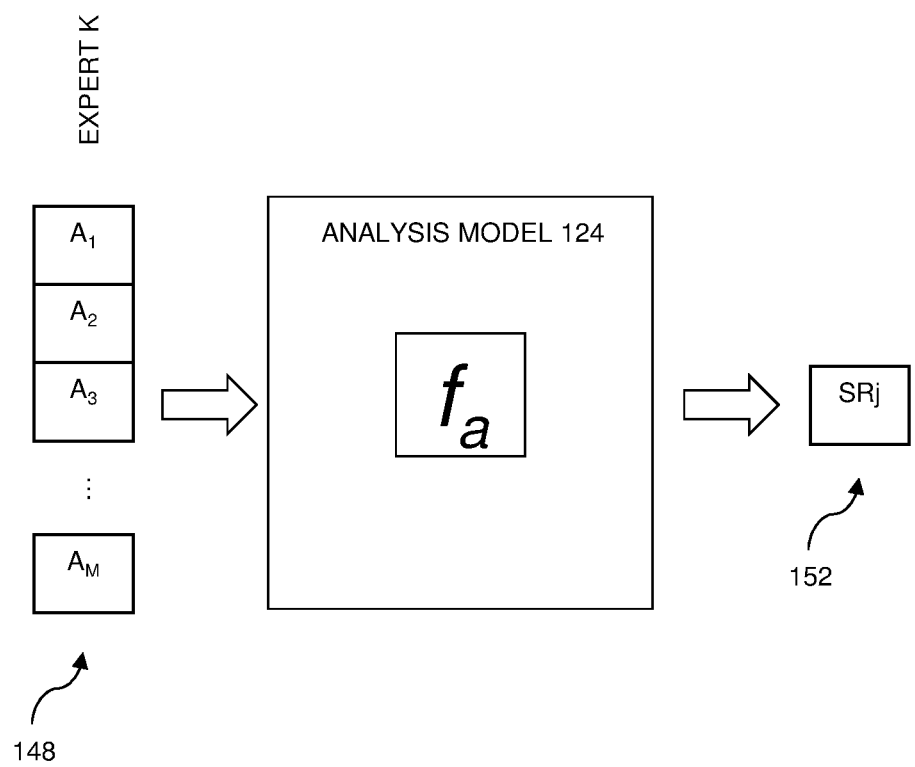
FIG. 3 is a block diagram of a system for generating expert selection prediction data for assisting experts associated with a data management system to improve the effectiveness of their profiles, in accordance with one embodiment.

FIG. 3 is a block diagram of a process 300 for generating expert selection prediction data for assisting experts associated with a data management system to improve the effectiveness of their profiles, in accordance with one embodiment.

In one embodiment, the analysis model 124 is utilized to identify adjustments that can be made to the profile of an expert in order to improve the selection rate associated with the expert. In particular, expert profile data 148 associated with an expert is passed into the analysis model 124. The analysis model 124 makes adjustments to the expert profile data 148 in iterations. For each iteration, the analysis model 124 generates a predicted selection rate by applying the adjusted expert profile data 148 to the one or more functions f(a). The analysis model 124 generates expert selection prediction data 152 including the predicted selection rate for each iteration of adjustments to the expert profile data 148 associated with the expert.

In one embodiment, the expert profile data 148 associated with the selected expert is passed to the analysis model 124 as a series of M attribute values. Each attribute value corresponds to an attribute that is included or not included in the expert profile data 148 associated with the selected expert. During the analysis process, the analysis model 124 iteratively adjusts the value of each of the M attributes and generates a predicted selection rate (SR) for each iteration.

In one embodiment, some of the adjustments may result in a predicted selection rate that is higher than the current selection rate of the selected expert. The analysis model 124 analyzes the expert selection prediction data 152 and identifies the adjustments that resulted in the highest predicted selection rate. The analysis model 124 can then generate recommended profile adjustment data 132 recommending the identified adjustments to the selected expert.

Figure 4:
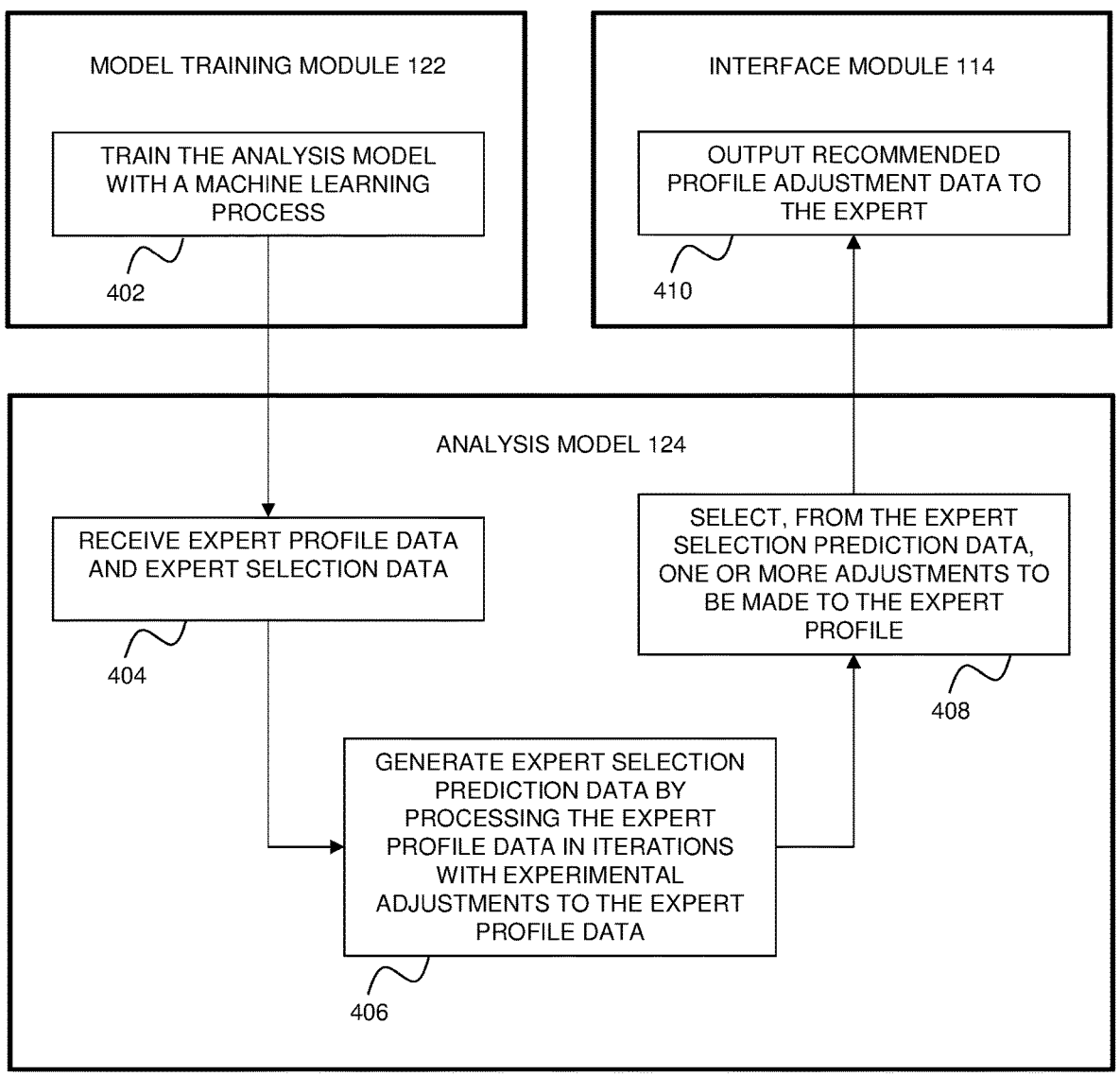
FIG. 4 is a block diagram of a process for assisting experts associated with a data management system to improve the effectiveness of their profiles, in accordance with one embodiment.

FIG. 4 illustrates a functional flow diagram of a process 400 for assisting experts associated with a data management system to improve the effectiveness of their profiles, in accordance with one embodiment.

Referring to FIGS. 1-4 and the description of FIGS. 1-3 above, at block 402 the model training module 122 trains the analysis model with a machine learning process, using any of the methods, processes, and procedures discussed above with respect to FIGS. 1-3, according to one embodiment. From block 402 the process proceeds to block 404.

At block 404 the analysis model 124 receives expert profile data and expert selection data associated with a selected expert, using any of the methods, processes, and procedures discussed above with respect to FIGS. 1-3, according to one embodiment. From block 404 the process proceeds to block 406.

At block 406 the analysis model 124 generates expert selection prediction data by processing the expert profile data in iterations with experimental adjustments to the expert profile data, using any of the methods, processes, and procedures discussed above with respect to FIGS. 1-3, according to one embodiment. From block 406 the process proceeds to block 408.

At block 408 the analysis model 124 selects, from the expert selection prediction data, one or more adjustments to be made to the expert profile, using any of the methods, processes, and procedures discussed above with respect to FIGS. 1-3, according to one embodiment. From block 408 the process proceeds to block 410.

At block 410 the interface module 114 outputs recommended profile adjustment data to the expert, using any of the methods, processes, and procedures discussed above with respect to FIGS. 1-3, according to one embodiment.

Those of skill in the art will recognize, in light of the present disclosure, that the process 400 can include different steps and different orders of steps, other than those represented in FIG. 4. All such other processes fall within the scope of the present disclosure.

Figure 5:
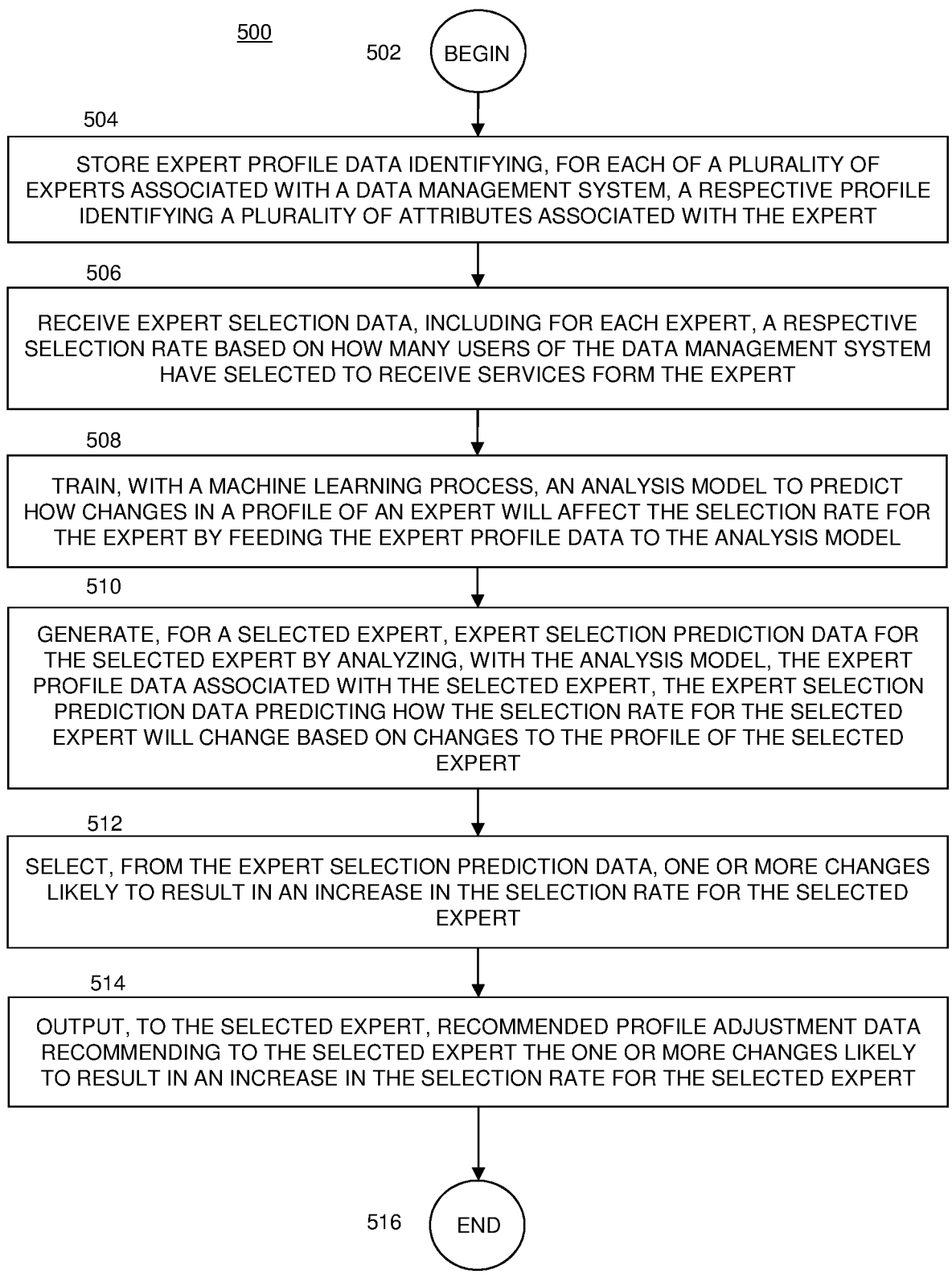
FIG. 5 is a flow diagram of a process for assisting experts associated with a data management system to improve the effectiveness of their profiles, in accordance with one embodiment.

FIG. 5 illustrates a flow diagram of a process 500 for assisting experts associated with a data management system to improve the effectiveness of their profiles, according to various embodiments.

Referring to FIGS. 1-5, and the description of FIGS. 1-4 above, in one embodiment, process 500 begins at BEGIN 502 and process flow proceeds to STORE EXPERT PROFILE DATA IDENTIFYING, FOR EACH OF A PLURALITY OF EXPERTS ASSOCIATED WITH A DATA MANAGEMENT SYSTEM, A RESPECTIVE PROFILE IDENTIFYING A PLURALITY OF ATTRIBUTES ASSOCIATED WITH THE EXPERT 504.

In one embodiment, at STORE EXPERT PROFILE DATA IDENTIFYING, FOR EACH OF A PLURALITY OF EXPERTS ASSOCIATED WITH A DATA MANAGEMENT SYSTEM, A RESPECTIVE PROFILE IDENTIFYING A PLURALITY OF ATTRIBUTES ASSOCIATED WITH THE EXPERT 504, expert profile data is stored identifying, for each of a plurality of experts associated with a data management system, a respective profile identifying a plurality of attributes associated with the expert, using any of the methods, processes, and procedures discussed above with respect to FIGS. 1-4.

In one embodiment, once expert profile data is stored identifying, for each of a plurality of experts associated with a data management system, a respective profile identifying a plurality of attributes associated with the expert at STORE EXPERT PROFILE DATA IDENTIFYING, FOR EACH OF A PLURALITY OF EXPERTS ASSOCIATED WITH A DATA MANAGEMENT SYSTEM, A RESPECTIVE PROFILE IDENTIFYING A PLURALITY OF ATTRIBUTES ASSOCIATED WITH THE EXPERT 504 process flow proceeds to RECEIVE EXPERT SELECTION DATA, INCLUDING FOR EACH EXPERT, A RESPECTIVE SELECTION RATE BASED ON HOW MANY USERS OF THE DATA MANAGEMENT SYSTEM HAVE SELECTED TO RECEIVE SERVICES FROM THE EXPERT 506.

In one embodiment, at RECEIVE EXPERT SELECTION DATA, INCLUDING FOR EACH EXPERT, A RESPECTIVE SELECTION RATE BASED ON HOW MANY USERS OF THE DATA MANAGEMENT SYSTEM HAVE SELECTED TO RECEIVE SERVICES FROM THE EXPERT 506, expert selection data is received, including for each expert, a respective selection rate based on how many users of the data management system have selected to receive services from the expert, using any of the methods, processes, and procedures discussed above with respect to FIGS. 1-4.

In one embodiment, once expert selection data is received, including for each expert, a respective selection rate based on how many users of the data management system have selected to receive services from the expert at RECEIVE EXPERT SELECTION DATA, INCLUDING FOR EACH EXPERT, A RESPECTIVE SELECTION RATE BASED ON HOW MANY USERS OF THE DATA MANAGEMENT SYSTEM HAVE SELECTED TO RECEIVE SERVICES FROM THE EXPERT 506, process flow proceeds to TRAIN, WITH A MACHINE LEARNING PROCESS, AN ANALYSIS MODEL TO PREDICT HOW CHANGES IN A PROFILE OF AN EXPERT WILL AFFECT THE SELECTION RATE FOR THE EXPERT BY FEEDING THE EXPERT PROFILE DATA TO THE ANALYSIS MODEL 508.

In one embodiment, at TRAIN, WITH A MACHINE LEARNING PROCESS, AN ANALYSIS MODEL TO PREDICT HOW CHANGES IN A PROFILE OF AN EXPERT WILL AFFECT THE SELECTION RATE FOR THE EXPERT BY FEEDING THE EXPERT PROFILE DATA TO THE ANALYSIS MODEL 508, an analysis model is trained, with a machine learning process, to predict how changes in a profile of an expert will affect the selection rate for the expert by feeding the expert profile data to the analysis model, using any of the methods, processes, and procedures discussed above with respect to FIGS. 1-4.

In one embodiment, once an analysis model is trained, with a machine learning process, to predict how changes in a profile of an expert will affect the selection rate for the expert by feeding the expert profile data to the analysis model at TRAIN, WITH A MACHINE LEARNING PROCESS, AN ANALYSIS MODEL TO PREDICT HOW CHANGES IN A PROFILE OF AN EXPERT WILL AFFECT THE SELECTION RATE FOR THE EXPERT BY FEEDING THE EXPERT PROFILE DATA TO THE ANALYSIS MODEL 508, process flow proceeds to GENERATE, FOR A SELECTED EXPERT, EXPERT SELECTION PREDICTION DATA FOR THE SELECTED EXPERT BY ANALYZING, WITH THE ANALYSIS MODEL, THE EXPERT PROFILE DATA ASSOCIATED WITH THE SELECTED EXPERT, THE EXPERT SELECTION PREDICTION DATA PREDICTING HOW THE SELECTION RATE FOR THE SELECTED EXPERT WILL CHANGE BASED ON CHANGES TO THE PROFILE OF THE SELECTED EXPERT 510.

In one embodiment, at GENERATE, FOR A SELECTED EXPERT, EXPERT SELECTION PREDICTION DATA FOR THE SELECTED EXPERT BY ANALYZING, WITH THE ANALYSIS MODEL, THE EXPERT PROFILE DATA ASSOCIATED WITH THE SELECTED EXPERT, THE EXPERT SELECTION PREDICTION DATA PREDICTING HOW THE SELECTION RATE FOR THE SELECTED EXPERT WILL CHANGE BASED ON CHANGES TO THE PROFILE OF THE SELECTED EXPERT 510, expert selection prediction data is generated, for a selected expert, by analyzing, with the analysis model, the expert profile data associated with the selected expert, the expert selection prediction data predicting how the selection rate for the selected expert will change based on changes to the profile of the selected expert, using any of the methods, processes, and procedures discussed above with respect to FIGS. 1-4.

In one embodiment, once expert selection prediction data is generated, for a selected expert, by analyzing, with the analysis model, the expert profile data associated with the selected expert, the expert selection prediction data predicting how the selection rate for the selected expert will change based on changes to the profile of the selected expert at GENERATE, FOR A SELECTED EXPERT, EXPERT SELECTION PREDICTION DATA FOR THE SELECTED EXPERT BY ANALYZING, WITH THE ANALYSIS MODEL, THE EXPERT PROFILE DATA ASSOCIATED WITH THE SELECTED EXPERT, THE EXPERT SELECTION PREDICTION DATA PREDICTING HOW THE SELECTION RATE FOR THE SELECTED EXPERT WILL CHANGE BASED ON CHANGES TO THE PROFILE OF THE SELECTED EXPERT 510, process flow proceeds to SELECT, FROM THE EXPERT SELECTION PREDICTION DATA, ONE OR MORE CHANGES LIKELY TO RESULT IN AN INCREASE IN THE SELECTION RATE FOR THE SELECTED EXPERT 512.

In one embodiment, at SELECT, FROM THE EXPERT SELECTION PREDICTION DATA, ONE OR MORE CHANGES LIKELY TO RESULT IN AN INCREASE IN THE SELECTION RATE FOR THE SELECTED EXPERT 512, one or more changes likely to result in an increase in the selection rate for the selected expert are selected, from the expert selection prediction data, using any of the methods, processes, and procedures discussed above with respect to FIGS. 1-4.

In one embodiment, once one or more changes likely to result in an increase in the selection rate for the selected expert are selected, from the expert selection prediction data at SELECT, FROM THE EXPERT SELECTION PREDICTION DATA, ONE OR MORE CHANGES LIKELY TO RESULT IN AN INCREASE IN THE SELECTION RATE FOR THE SELECTED EXPERT 512, process flow proceeds to OUTPUT, TO THE SELECTED EXPERT, RECOMMENDED PROFILE ADJUSTMENT DATA RECOMMENDING TO THE SELECTED EXPERT THE ONE OR MORE CHANGES LIKELY TO RESULT IN AN INCREASE IN THE SELECTION RATE FOR THE SELECTED EXPERT 514.

In one embodiment, at OUTPUT, TO THE SELECTED EXPERT, RECOMMENDED PROFILE ADJUSTMENT DATA RECOMMENDING TO THE SELECTED EXPERT THE ONE OR MORE CHANGES LIKELY TO RESULT IN AN INCREASE IN THE SELECTION RATE FOR THE SELECTED EXPERT 514, recommended profile adjustment data is output, to the selected expert, recommending to the selected expert the one or more changes likely to result in an increase in the selection rate for the selected expert, using any of the methods, processes, and procedures discussed above with respect to FIGS. 1-4.

In one embodiment, once recommended profile adjustment data is output, to the selected expert, recommending to the selected expert the one or more changes likely to result in an increase in the selection rate for the selected expert at OUTPUT, TO THE SELECTED EXPERT, RECOMMENDED PROFILE ADJUSTMENT DATA RECOMMENDING TO THE SELECTED EXPERT THE ONE OR MORE CHANGES LIKELY TO RESULT IN AN INCREASE IN THE SELECTION RATE FOR THE SELECTED EXPERT 514, process flow proceeds to END 516.

In one embodiment, at END 516 the process for assisting experts associated with a data management system to improve the effectiveness of their profiles is exited to await new data and/or instructions.

Figure 6:
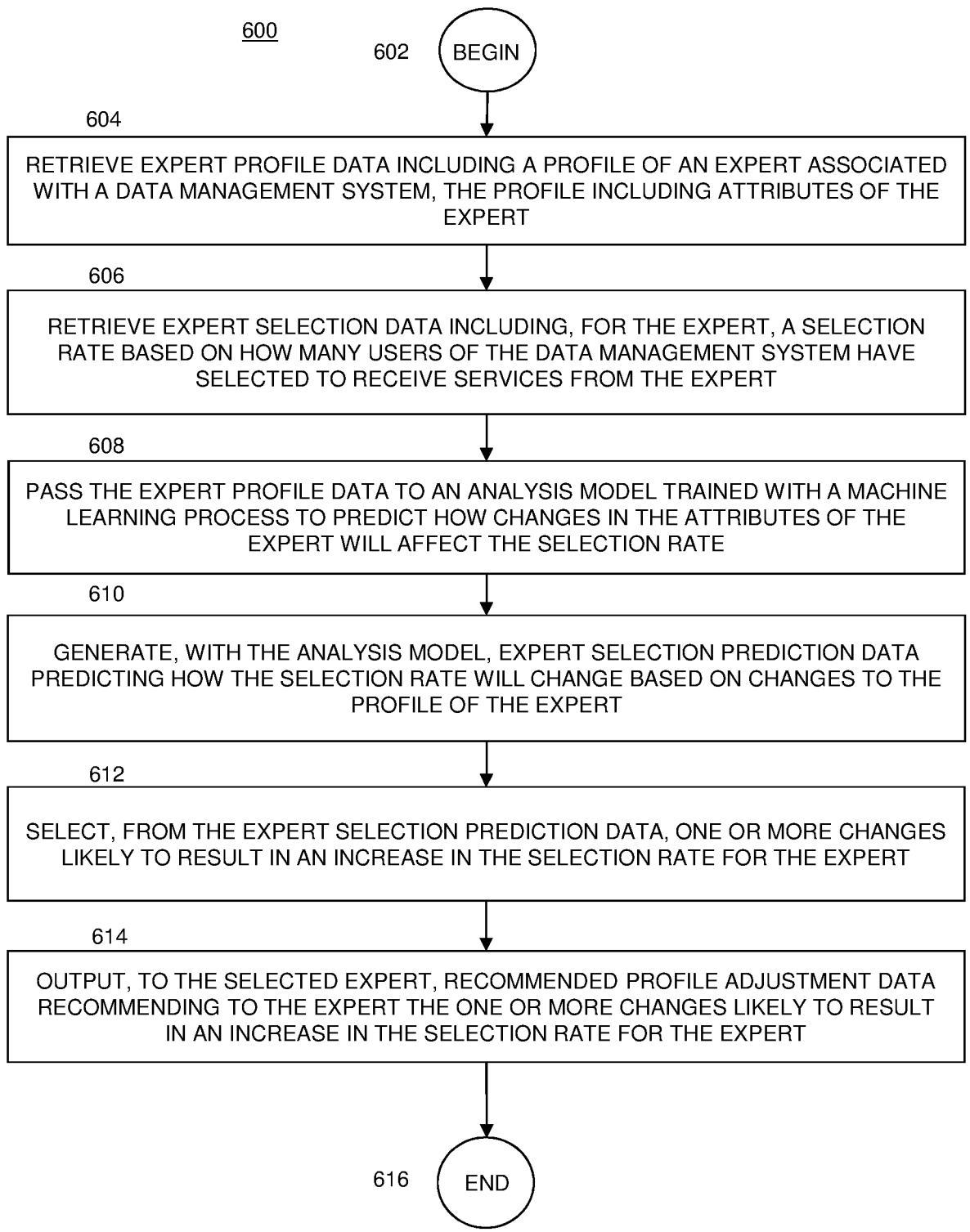
FIG. 6 is a flow diagram of a process for assisting experts associated with a data management system to improve the effectiveness of their profiles, in accordance with one embodiment.

FIG. 6 illustrates a flow diagram of a process 600 for assisting experts associated with a data management system to improve the effectiveness of their profiles, according to various embodiments.

Referring to FIGS. 1-4,6 and the description of FIGS. 1-4 above, in one embodiment, process 600 begins at BEGIN 602 and process flow proceeds to RETRIEVE EXPERT PROFILE DATA INCLUDING A PROFILE OF AN EXPERT ASSOCIATED WITH A DATA MANAGEMENT SYSTEM, THE PROFILE INCLUDING ATTRIBUTES OF THE EXPERT 604.

In one embodiment, at RETRIEVE EXPERT PROFILE DATA INCLUDING A PROFILE OF AN EXPERT ASSOCIATED WITH A DATA MANAGEMENT SYSTEM, THE PROFILE INCLUDING ATTRIBUTES OF THE EXPERT 604, expert profile data is retrieved including a profile of an expert associated with a data management system, the profile including attributes of the expert, using any of the methods, processes, and procedures discussed above with respect to FIGS. 1-4.

In one embodiment, once expert profile data is retrieved including a profile of an expert associated with a data management system, the profile including attributes of the expert at RETRIEVE EXPERT PROFILE DATA INCLUDING A PROFILE OF AN EXPERT ASSOCIATED WITH A DATA MANAGEMENT SYSTEM, THE PROFILE INCLUDING ATTRIBUTES OF THE EXPERT 604 process flow proceeds to RETRIEVE EXPERT SELECTION DATA INCLUDING, FOR THE EXPERT, A SELECTION RATE BASED ON HOW MANY USERS OF THE DATA MANAGEMENT SYSTEM HAVE SELECTED TO RECEIVE SERVICES FROM THE EXPERT 606.

In one embodiment, at RETRIEVE EXPERT SELECTION DATA INCLUDING, FOR THE EXPERT, A SELECTION RATE BASED ON HOW MANY USERS OF THE DATA MANAGEMENT SYSTEM HAVE SELECTED TO RECEIVE SERVICES FROM THE EXPERT 606, expert selection data is retrieved including, for the expert, a selection rate based on how many users of the data management system have selected to receive services from the expert, using any of the methods, processes, and procedures discussed above with respect to FIGS. 1-4.

In one embodiment, once expert selection data is retrieved including, for the expert, a selection rate based on how many users of the data management system have selected to receive services from the expert at RETRIEVE EXPERT SELECTION DATA INCLUDING, FOR THE EXPERT, A SELECTION RATE BASED ON HOW MANY USERS OF THE DATA MANAGEMENT SYSTEM HAVE SELECTED TO RECEIVE SERVICES FROM THE EXPERT 606, process flow proceeds to PASS THE EXPERT PROFILE DATA TO AN ANALYSIS MODEL TRAINED WITH A MACHINE LEARNING PROCESS TO PREDICT HOW CHANGES IN THE ATTRIBUTES OF THE EXPERT WILL AFFECT THE SELECTION RATE 608.

In one embodiment, at PASS THE EXPERT PROFILE DATA TO AN ANALYSIS MODEL TRAINED WITH A MACHINE LEARNING PROCESS TO PREDICT HOW CHANGES IN THE ATTRIBUTES OF THE EXPERT WILL AFFECT THE SELECTION RATE 608, the expert profile data is passed to an analysis model trained with a machine learning process to predict how changes in the attributes of the expert will affect the selection rate, using any of the methods, processes, and procedures discussed above with respect to FIGS. 1-4.

In one embodiment, once the expert profile data is passed to an analysis model trained with a machine learning process to predict how changes in the attributes of the expert will affect the selection rate at PASS THE EXPERT PROFILE DATA TO AN ANALYSIS MODEL TRAINED WITH A MACHINE LEARNING PROCESS TO PREDICT HOW CHANGES IN THE ATTRIBUTES OF THE EXPERT WILL AFFECT THE SELECTION RATE 608, process flow proceeds to GENERATE, WITH THE ANALYSIS MODEL, EXPERT SELECTION PREDICTION DATA PREDICTING HOW THE SELECTION RATE WILL CHANGE BASED ON CHANGES TO THE PROFILE OF THE EXPERT 610.

In one embodiment, at GENERATE, WITH THE ANALYSIS MODEL, EXPERT SELECTION PREDICTION DATA PREDICTING HOW THE SELECTION RATE WILL CHANGE BASED ON CHANGES TO THE PROFILE OF THE EXPERT 610, expert selection prediction data is generated, with the analysis model, predicting how the selection rate will change based on changes to the profile of the expert, using any of the methods, processes, and procedures discussed above with respect to FIGS. 1-4.

In one embodiment, once expert selection prediction data is generated, with the analysis model, predicting how the selection rate will change based on changes to the profile of the expert at GENERATE, WITH THE ANALYSIS MODEL, EXPERT SELECTION PREDICTION DATA PREDICTING HOW THE SELECTION RATE WILL CHANGE BASED ON CHANGES TO THE PROFILE OF THE EXPERT 610, process flow proceeds to SELECT, FROM THE EXPERT SELECTION PREDICTION DATA, ONE OR MORE CHANGES LIKELY TO RESULT IN AN INCREASE IN THE SELECTION RATE FOR THE EXPERT 612.

In one embodiment, at SELECT, FROM THE EXPERT SELECTION PREDICTION DATA, ONE OR MORE CHANGES LIKELY TO RESULT IN AN INCREASE IN THE SELECTION RATE FOR THE EXPERT 612, one or more changes likely to result in an increase in the selection rate for the expert are selected, from the expert selection prediction data, using any of the methods, processes, and procedures discussed above with respect to FIGS. 1-4.

In one embodiment, once one or more changes likely to result in an increase in the selection rate for the expert are selected, from the expert selection prediction data at SELECT, FROM THE EXPERT SELECTION PREDICTION DATA, ONE OR MORE CHANGES LIKELY TO RESULT IN AN INCREASE IN THE SELECTION RATE FOR THE EXPERT 612, process flow proceeds to OUTPUT, TO THE SELECTED EXPERT, RECOMMENDED PROFILE ADJUSTMENT DATA RECOMMENDING TO THE EXPERT THE ONE OR MORE CHANGES LIKELY TO RESULT IN AN INCREASE IN THE SELECTION RATE FOR THE EXPERT 614.

In one embodiment, at OUTPUT, TO THE SELECTED EXPERT, RECOMMENDED PROFILE ADJUSTMENT DATA RECOMMENDING TO THE EXPERT THE ONE OR MORE CHANGES LIKELY TO RESULT IN AN INCREASE IN THE SELECTION RATE FOR THE EXPERT 614, recommended profile adjustment data is output, to the selected expert, recommending to the expert the one or more changes likely to result in an increase in the selection rate for the expert, using any of the methods, processes, and procedures discussed above with respect to FIGS. 1-4.

In one embodiment, once recommended profile adjustment data is output, to the selected expert, recommending to the expert the one or more changes likely to result in an increase in the selection rate for the expert at OUTPUT, TO THE SELECTED EXPERT, RECOMMENDED PROFILE ADJUSTMENT DATA RECOMMENDING TO THE EXPERT THE ONE OR MORE CHANGES LIKELY TO RESULT IN AN INCREASE IN THE SELECTION RATE FOR THE EXPERT 614, process flow proceeds to END 616.

In one embodiment, at END 616 the process for assisting experts associated with a data management system to improve the effectiveness of their profiles is exited to await new data and/or instructions.

As noted above, the specific illustrative examples discussed above are but illustrative examples of implementations of embodiments of the method or process for assisting experts associated with a data management system to improve the effectiveness of their profiles. Those of skill in the art will readily recognize that other implementations and embodiments are possible. Therefore, the discussion above should not be construed as a limitation on the claims provided below.

In one embodiment, a computing system implemented method assists experts associated with a data management system to improve the effectiveness of their profiles. The method includes storing expert profile data identifying, for each of a plurality of experts associated with a data management system, a respective profile identifying a plurality of attributes associated with the expert. The method includes receiving expert selection data, including for each expert, a respective selection rate based on how many users of the data management system have selected to receive services from the expert. The method includes training, with a machine learning process, an analysis model to predict how changes in a profile of an expert will affect the selection rate for the expert by feeding the expert profile data to the analysis model. The method includes generating, for a selected expert, expert selection prediction data for the selected expert by analyzing, with the analysis model, the expert profile data associated with the selected expert. The expert selection prediction data predicts how the selection rate for the selected expert will change based on changes to the profile of the selected expert. The method includes selecting, from the expert selection prediction data, one or more changes likely to result in an increase in the selection rate for the selected expert and outputting, to the selected expert, recommended profile adjustment data recommending to the selected expert the one or more changes likely to result in an increase in the selection rate for the selected expert.

In one embodiment, a system for assisting experts associated with a data management system to improve the effectiveness of their profiles, the system includes at least one processor at least one memory coupled to the at least one processor. The at least one memory has stored therein instructions which, when executed by any set of the one or more processors, perform a process. The process includes storing expert profile data identifying, for each of a plurality of experts associated with a data management system, a respective profile identifying a plurality of attributes associated with the expert. The process includes receiving expert selection data, including for each expert, a respective selection rate based on how many users of the data management system have selected to receive services from the expert. The process includes training, with a machine learning process, an analysis model to predict how changes in a profile of an expert will affect the selection rate for the expert by feeding the expert profile data to the analysis model. The process includes generating, for a selected expert, expert selection prediction data for the selected expert by analyzing, with the analysis model, the expert profile data associated with the selected expert. The expert selection prediction data predicts how the selection rate for the selected expert will change based on changes to the profile of the selected expert. The process includes selecting, from the expert selection prediction data, one or more changes likely to result in an increase in the selection rate for the selected expert and outputting, to the selected expert, recommended profile adjustment data recommending to the selected expert the one or more changes likely to result in an increase in the selection rate for the selected expert.

In one embodiment, a computing system implemented method assists experts associated with a data management system to improve the effectiveness of their profiles. The method includes retrieving expert profile data including a profile of an expert associated with a data management system. The profile includes attributes of the expert. The method includes retrieving expert selection data including, for the expert, a selection rate based on how many users of the data management system have selected to receive services from the expert. The method includes passing the expert profile data to an analysis model trained with a machine learning process to predict how changes in the attributes of the expert will affect the selection rate and generating, with the analysis model, expert selection prediction data predicting how the selection rate will change based on changes to the profile of the expert. The method includes selecting, from the expert selection prediction data, one or more changes likely to result in an increase in the selection rate for the expert and outputting, to the selected expert, recommended profile adjustment data recommending to the user the one or more changes likely to result in an increase in the selection rate for the expert.

In one embodiment, a system for assisting experts associated with a data management system to improve the effectiveness of their profiles, the system includes at least one processor at least one memory coupled to the at least one processor. The at least one memory has stored therein instructions which, when executed by any set of the one or more processors, perform a process. The process includes retrieving expert profile data including a profile of an expert associated with a data management system. The profile includes attributes of the expert. The process includes retrieving expert selection data including, for the expert, a selection rate based on how many users of the data management system have selected to receive services from the expert. The process includes passing the expert profile data to an analysis model trained with a machine learning process to predict how changes in the attributes of the expert will affect the selection rate and generating, with the analysis model, expert selection prediction data predicting how the selection rate will change based on changes to the profile of the expert. The process includes selecting, from the expert selection prediction data, one or more changes likely to result in an increase in the selection rate for the expert and outputting, to the selected expert, recommended profile adjustment data recommending to the user the one or more changes likely to result in an increase in the selection rate for the expert.

The disclosed embodiments provide one or more technical solutions to the technical problem of providing data management systems that dynamically assist experts to improve the rate with which users select to access their services. These and other embodiments of the data management system are discussed in further detail below.

Assisting experts associated with a data management system to improve the effectiveness of their profiles does not constitute an abstract idea, but rather represents a technical solution to a technical problem of data management systems that are unable to effectively assist experts to improve their profiles. First, assisting experts associated with a data management system to improve the effectiveness of their profiles is not an abstract idea because it is not merely an idea itself (e.g., can be performed mentally or using pen and paper). Second, assisting experts associated with a data management system to improve the effectiveness of their profiles is not an abstract idea because it is not a fundamental economic practice (e.g., is not merely creating a contractual relationship, hedging, mitigating a settlement risk, etc.). Third, assisting experts associated with a data management system to improve the effectiveness of their profiles is not an abstract idea because it is not a method of organizing human activity (e.g., managing a game of bingo). Fourth, although mathematics may be used to generate an analytics analysis model, the disclosed and claimed methods and systems of assisting experts associated with a data management system to improve the effectiveness of their profiles are not an abstract idea because the methods and systems are not simply a mathematical relationship/formula.

Assisting experts associated with a data management system to improve the effectiveness of their profiles is not an abstract idea because having a data management system that dynamically assists affiliated experts to improve their profiles yields significant improvement to the technical fields of user experience, customer service, customer retention, and electronic data management, according to one embodiment. The present disclosure adds significantly to the field of electronic data management because the disclosed data management system increases the knowledge of the needs and purposes of users of the data management system, increases the ability of the data management system to provide automated assistance in improving expert profiles increases the likelihood of improving/maintaining experts' and users' trust in the data management system; and reduces the amount of time experts spend revising profiles and users spend searching for experts, according to one embodiment.

As a result, embodiments of the present disclosure allow for reduced use of processor cycles, memory, and power consumption, by reducing the time spent by users searching and experts revising profiles. Consequently, computing and communication systems implementing or providing the embodiments of the present disclosure are transformed into more operationally efficient devices and systems.

In addition to improving overall computing performance, assisting experts associated with a data management system to improve the effectiveness of their profiles significantly improves the field of data management systems by reducing the amount of time it takes for an expert to effectively revise a profile and for a user to locate a suitable expert, according to one embodiment. Therefore, both human and non-human resources are utilized more efficiently. Furthermore, by assisting experts associated with a data management system to improve the effectiveness of their profiles, loyalty in the data management system is increased. This results in repeat customers, efficient data management services, and reduced abandonment of use of the data management system, according to one embodiment.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

As used herein, the term "account" includes, but is not limited to, a grouping of transactions within an accounting system. For instance, in various embodiments, accounts can be hierarchical in that one account can contain the content of one or more other accounts. Apart for hierarchical nesting accounts may also be structured to be either mutually exclusive or not mutually exclusive such that if there is a containment relationship between two accounts the containment may either be complete or partial.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for assisting users with improving the effectiveness of their profiles, the method performed by one or more processors of a system and comprising:
    storing profile data in a user profile database of the system, the profile data including, for each respective user of a plurality of users associated with the system, a profile identifying attributes associated with the respective user;
    obtaining, from the user profile database using the one or more processors, a selection data vector including values each indicating a selection rate for a respective user, each selection rate indicative of a rate at which users of the system have chosen to receive services from the respective user after selecting the respective user's profile;
    generating, for a selected user associated with a user computing environment used to interact with the system, selection prediction data for the selected user by analyzing, using an analysis model, the profile data associated with the selected user, the selection prediction data predicting, for each respective change of a set of possible changes to the selected user's profile, how the selection rate for the selected user will change if the selected user's profile is adjusted in accordance with the respective change, wherein the analysis model is trained, using a model training module in conjunction with a machine learning process, to predict how changes in a profile of a given user will affect the selection rate for the given user based on feeding the profile data associated with the given user to the analysis model and comparing the values included in the selection data vector with selection rates included in a selection rate vector generated for the plurality of users based on the attributes, and wherein the analysis model is retrained, using the model training module in conjunction with the machine learning process, until a difference between the values included in the selection data vector and the values included in the selection rate vector is below a threshold;
    selecting, from the selection prediction data, one or more recommended changes likely to result in an increase in the selection rate for the selected user; and
    outputting, to the selected user via an interface module communicatively coupled to the user computing environment, recommended profile adjustment data including a prompt recommending that the selected user make at least one of the one or more recommended changes to the selected user's profile.

2. The method of claim 1, wherein the attributes include at least one of a profile picture associated with the user, a name associated with the user, an address associated with the user, an area of specialty associated with the user, a font associated with a script included in the profile, an arrangement of images or text included in the profile, customer testimonials associated with the user, awards or accolades associated with the user, professional credentials associated with the user, professional memberships associated with the user, academic history associated with the user, an indication as to whether the user has addressed a negative customer review, sentiment characteristics of the profile, or an aggregated rating associated with the user.

3. The method of claim 1, wherein the prompt recommends two or more adjustments likely to result in a greatest increase in the selection rate for the selected user, and wherein the prompt lists the two or more adjustments in order of likelihood of greatest increase in the selection rate for the selected user.

4. The method of claim 1, wherein the prompt includes data indicating the predicted change in the selection rate of the selected user should the selected user adjust the profile in accordance with the one or more recommended changes.

5. The method of claim 1, wherein generating the selection prediction data includes:
    iteratively adjusting attributes of the profile of the selected user; and
    determining a predicted change in the selection rate based on each iteration.

6. The method of claim 1, wherein the machine learning process includes at least one of a supervised machine learning process or an unsupervised machine learning process.

7. The method of claim 1, wherein the machine learning process incorporates one or more aspects of a linear regression model, a naïve bayes analysis model, a Latent Dirichlet Allocation analysis model, a logistic regression analysis model, a random forest analysis model, a decision tree analysis model, or an inductive logic programming analysis model.

8. The method of claim 1, wherein the one or more changes include at least one of deleting an attribute that currently exists in the profile of the selected user, modifying an attribute that currently exists in the profile of the selected user, or adding an attribute that does not currently exist in the profile of the selected user.

9. The method of claim 1, wherein the selection rates are averaged over a selected length of time.

10. A system for assisting users with improving the effectiveness of their profiles, the system comprising:
    one or more processors; and
    at least one memory coupled to the one or more processors and storing instructions that, when executed by the one or more processors, cause the system to perform operations including:
        storing profile data in a profile database of the system, the profile data including, for each respective user of a plurality of users associated with the system, a profile identifying attributes associated with the respective user;
        obtaining, from the profile database using the one or more processors, a selection data vector including values each indicating a selection rate for a respective user, each selection rate indicative of a rate at which users of the system have chosen to receive services from the respective user after selecting the respective user's profile;
        generating, for a selected user associated with a user computing environment used to interact with the system, selection prediction data for the selected user by analyzing, using an analysis model, the profile data associated with the selected user, the selection prediction data predicting, for each respective change of a set of possible changes to the selected user's profile, how the selection rate for the selected user will change if the selected user's profile is adjusted in accordance with the respective change, wherein the analysis model is trained, using a model training module in conjunction with a machine learning process, to predict how changes in a profile of a given user will affect the selection rate for the given user based on feeding the profile data associated with the given user to the analysis model and comparing the values included in the selection data vector with selection rates included in a selection rate vector generated for the plurality of users based on the attributes, and wherein the analysis model is retrained, using the model training module in conjunction with the machine learning process, until a difference between the values included in the selection data vector and the values included in the selection rate vector is below a threshold;

selecting, from the selection prediction data, one or more recommended changes likely to result in an increase in the selection rate for the selected user; and outputting, to the selected user via an interface module communicatively coupled to the user computing environment, recommended profile adjustment data including a prompt recommending that the selected user make at least one of the one or more recommended changes to the selected user's profile.

11. The system of claim 10, wherein the attributes include at least one of a profile picture associated with the user, a name associated with the user, an address associated with the user, an area of specialty associated with the user, a font associated with a script included in the profile, an arrangement of images or text included in the profile, customer testimonials associated with the user, awards or accolades associated with the user, professional credentials associated with the user, professional memberships associated with the user, academic history associated with the user, an indication as to whether the user has addressed a negative customer review, sentiment characteristics of the profile, or an aggregated rating associated with the user.

12. The system of claim 10, wherein the prompt recommends two or more adjustments likely to result in a greatest increase in the selection rate for the selected user, and wherein the prompt lists the two or more adjustments in order of likelihood of greatest increase in the selection rate for the selected user.

13. The system of claim 10, wherein the prompt includes data indicating the predicted change in the selection rate of the selected user should the selected user adjust the profile in accordance with the one or more recommended changes.

14. The system of claim 10, wherein generating the selection prediction data includes:

iteratively adjusting attributes of the profile of the selected user; and determining a predicted change in the selection rate based on each iteration.

15. The system of claim 10, wherein the machine learning process includes at least one of a supervised machine learning process or an unsupervised machine learning process.

16. The system of claim 10, wherein the machine learning process incorporates one or more aspects of a linear regression model, a naïve bayes analysis model, a Latent Dirichlet Allocation analysis model, a logistic regression analysis model, a random forest analysis model, a decision tree analysis model, or an inductive logic programming analysis model.

17. The system of claim 10, wherein the one or more changes include at least one of deleting an attribute that currently exists in the profile of the selected user, modifying an attribute that currently exists in the profile of the selected user, or adding an attribute that does not currently exist in the profile of the selected user.

18. The system of claim 10, wherein the selection rates are averaged over a selected length of time.

19. A non-transitory computer-readable medium storing instructions that, when executed by at least one or more processors of a system for assisting users with improving the effectiveness of their profiles, cause the system to perform operations including:

storing profile data in a profile database of the system, the profile data including, for each respective user of a plurality of users associated with the system, a profile identifying attributes associated with the respective user;

obtaining, from the profile database using the one or more processors, a selection data vector including values each indicating a selection rate for a respective user, each selection rate indicative of a rate at which users of the system have chosen to receive services from the respective user after selecting the respective user's profile;

generating, for a selected user associated with a user computing environment used to interact with the system, selection prediction data for the selected user by analyzing, using an analysis model, the profile data associated with the selected user, the selection prediction data predicting, for each respective change of a set of possible changes to the selected user's profile, how the selection rate for the selected user will change if the selected user's profile is adjusted in accordance with the respective change, wherein the analysis model is trained, using a model training module in conjunction with a machine learning process, to predict how changes in a profile of a given user will affect the selection rate for the given user based on feeding the profile data associated with the given user to the analysis model and comparing the values included in the selection data vector with selection rates included in a selection rate vector generated for the plurality of users based on the attributes, and wherein the analysis model is retrained, using the model training module in conjunction with the machine learning process, until a difference between the values included in the selection data vector and the values included in the selection rate vector is below a threshold;

selecting, from the selection prediction data, one or more recommended changes likely to result in an increase in the selection rate for the selected user; and outputting, to the selected user via an interface module communicatively coupled to the user computing environment, recommended profile adjustment data including a prompt recommending that the selected user make at least one of the one or more recommended changes to the selected user's profile.

20. The computer-readable medium of claim 19, wherein the attributes include at least one of a profile picture associated with the user, a name associated with the user, an address associated with the user, an area of specialty associated with the user, a font associated with a script included in the profile, an arrangement of images or text included in the profile, customer testimonials associated with the user, awards or accolades associated with the user, professional credentials associated with the user, professional memberships associated with the user, academic history associated with the user, an indication as to whether the user has addressed a negative customer review, sentiment characteristics of the profile, or an aggregated rating associated with the user.

* * * * *